(12) United States Patent
Berg et al.

(10) Patent No.: US 11,994,750 B2
(45) Date of Patent: May 28, 2024

(54) GOGGLE WITH ANTI-FOG LENS

(71) Applicant: Polaris Industries Inc., Medina, MN (US)

(72) Inventors: Andrew James Berg, Spokane, WA (US); Bill C. Hartlieb, Spokane, WA (US)

(73) Assignee: Polaris Industries Inc., Medina, MN (US)

( * ) Notice: Subject to any disclaimer, the term of this patent is extended or adjusted under 35 U.S.C. 154(b) by 640 days.

(21) Appl. No.: 17/143,974

(22) Filed: Jan. 7, 2021

(65) Prior Publication Data

US 2022/0214567 A1 Jul. 7, 2022

(51) Int. Cl.
| | |
|---|---|
| A42B 3/24 | (2006.01) |
| A42B 3/22 | (2006.01) |
| G02C 11/00 | (2006.01) |
| G02C 11/08 | (2006.01) |

(52) U.S. Cl.
CPC ............... *G02C 11/08* (2013.01); *A42B 3/22* (2013.01); *A42B 3/24* (2013.01); *A42B 3/245* (2013.01); *G02C 11/10* (2013.01); *G02C 2200/02* (2013.01)

(58) Field of Classification Search
CPC .... G02C 11/08; G02C 11/10; G02C 2200/02; A42B 3/22; A42B 3/24; A42B 3/245
See application file for complete search history.

(56) References Cited

U.S. PATENT DOCUMENTS

| | | | |
|---|---|---|---|
| 4,443,893 A | 4/1984 | Yamamoto | |
| 4,868,929 A | 9/1989 | Curcio | |
| 5,452,480 A | 9/1995 | Ryden | |
| 8,566,962 B2 | 10/2013 | Cornelius | |
| 8,756,715 B1 * | 6/2014 | Moffitt, Jr. | A42B 3/24 |
| | | | 2/171.3 |
| 9,301,879 B2 | 4/2016 | McCulloch | |
| 9,351,880 B2 | 5/2016 | McCulloch | |
| 10,398,601 B2 * | 9/2019 | Cornelius | A61F 9/02 |

(Continued)

FOREIGN PATENT DOCUMENTS

| | | |
|---|---|---|
| CN | 108983440 A | 12/2018 |
| CN | 211826783 | 10/2020 |

OTHER PUBLICATIONS

International Search Report and Written Opinion received for PCT Patent Application No. PCT/US2022/011543, dated Mar. 24, 2022, 11 pages.

*Primary Examiner* — Khaled Annis
(74) *Attorney, Agent, or Firm* — Faegre Drinker Biddle & Reath LLP

(57) ABSTRACT

A goggle with an anti-fogging lens including a body portion operable to interface with a face of a user. The goggle body includes a power source and a body magnet. The power source is in electrical connection with the body magnet. Additionally, the goggle includes a lens portion operable to be removeable coupled to the body portion. The lens portion includes a lens, a resistive element coupled to the lens and operable to heat the lens, and a lens magnet in electrical connection with the resistive element. The body magnet and the lens magnet form complementary magnetic fields operable to hold the lens portion to the body portion, the lens magnet is operable to conduct electricity from the power source to the resistive element.

20 Claims, 9 Drawing Sheets

(56) References Cited

U.S. PATENT DOCUMENTS

| | | | |
|---|---|---|---|
| 10,456,299 B2* | 10/2019 | Hilton | A61F 9/025 |
| 11,234,867 B2* | 2/2022 | Frensley | A61F 9/025 |
| 11,510,814 B2* | 11/2022 | Bouchard Fortin | A61F 9/028 |
| 11,510,815 B2* | 11/2022 | Marconi | A61F 9/025 |
| 11,691,001 B2* | 7/2023 | Paz | A61N 1/36031 |
| | | | 607/46 |
| 2004/0144382 A1* | 7/2004 | Alvey | A62B 18/006 |
| | | | 128/201.22 |
| 2005/0036100 A1* | 2/2005 | Rice | A42B 3/286 |
| | | | 351/62 |
| 2006/0023322 A1* | 2/2006 | McNeal | G02C 11/08 |
| | | | 359/819 |
| 2008/0290081 A1* | 11/2008 | Biddell | F21S 45/60 |
| | | | 219/203 |
| 2012/0246808 A1* | 10/2012 | Spiro | A61F 9/028 |
| | | | 2/424 |
| 2013/0091623 A1* | 4/2013 | McCulloch | A61F 9/027 |
| | | | 2/435 |
| 2014/0317836 A1* | 10/2014 | McCulloch | A61F 9/029 |
| | | | 2/435 |
| 2015/0290039 A1* | 10/2015 | McCulloch | A42B 3/24 |
| | | | 2/439 |
| 2016/0004085 A1* | 1/2016 | Stroetmann | G02B 27/017 |
| | | | 345/8 |
| 2016/0070120 A1* | 3/2016 | Cornelius | A61F 9/029 |
| | | | 219/211 |
| 2017/0361133 A1* | 12/2017 | Yu | A62B 18/006 |
| 2018/0000648 A1* | 1/2018 | McCulloch | H05B 3/06 |
| 2018/0105238 A1* | 4/2018 | Ji | A63B 31/00 |
| 2018/0217400 A1* | 8/2018 | Kon | G02C 11/08 |
| 2018/0239131 A1 | 8/2018 | Cornelius et al. | |
| 2018/0303190 A1* | 10/2018 | Calilung | A42B 3/185 |
| 2019/0009114 A1* | 1/2019 | Han | A41D 1/002 |
| 2019/0285913 A1* | 9/2019 | Howell | G02C 5/143 |
| 2019/0353933 A1* | 11/2019 | Kim | B01D 46/429 |
| 2020/0340660 A1* | 10/2020 | Van Straten | F21V 29/87 |
| 2020/0348539 A1* | 11/2020 | Xie | G02C 11/08 |
| 2021/0185855 A1* | 6/2021 | Maric | G06F 3/011 |
| 2021/0290989 A1* | 9/2021 | Hall | A62B 17/003 |
| 2021/0330831 A1* | 10/2021 | Laty | A62B 9/006 |
| 2021/0382328 A1* | 12/2021 | Ono | G02C 11/08 |
| 2022/0016450 A1* | 1/2022 | Hall | A42B 3/281 |
| 2022/0016451 A1* | 1/2022 | Hall | A62B 18/045 |
| 2022/0026746 A1* | 1/2022 | Lewis | G02C 11/08 |
| 2022/0214567 A1* | 7/2022 | Berg | G02C 11/10 |
| 2022/0225721 A1* | 7/2022 | Cafiero | A42B 3/245 |

\* cited by examiner

GOGGLE WITH ANTI-FOG LENS

FIELD OF THE DISCLOSURE

The present invention relates generally to a goggle and, in particular, to a google with an anti-fog lens.

BACKGROUND OF THE DISCLOSURE

Goggles are used in a variety of settings including many outdoor sports and recreational activities. Goggles provide a lens which protects a user's eyes from debris, moisture, and air. Goggles can be used in a variety of lighting conditions and, therefore, a single lens may not be suitable for all lighting conditions. For example, a tinted lens may be preferred under bright lighting conditions, whereas a yellow or orange lens may be preferred under low light conditions. If activities occur throughout a day or over several days with varying lighting conditions, it may be burdensome to change goggles, especially when in the field and when environmental conditions may change rapidly.

Interchangeable lenses can be used to adapt to the various lighting conditions. However, interchanging lenses can be burdensome, difficult, or leave the lens insecurely coupled to the goggle frame. This is especially true when a quick change may be desirable based on timing of the change (e.g., during a competition), because of the weather conditions (e.g., exposure of hands in sub-zero temperatures), or because of use in high-impact sports (e.g., lenses can be lost on impact when landing).

Another common problem with goggles is that under many circumstances the lens of the goggle can fog, thus obscuring the vision of a user. This can be inconvenient at best and dangerous at worst. Passive defogging features of goggles may be effective under certain circumstances (e.g., ventilation is effective while a user is moving and air is able to flow through the goggle), however, may not be effective in all circumstances. Active defogging features can be used but may limit or complicate the ability to interchange lenses. Furthermore, active defogging features can be inefficient or ineffective for providing the ability to defog the lens of a goggle over an extended period of time.

SUMMARY OF THE DISCLOSURE

A goggle with an anti-fogging lens is provided. Interchanging the anti-fogging lens is requires only attaching the interchangeable lens to a goggle body, wherein the electrical connection for powering an anti-fogging feature of the lens is automatically electrically coupled to a power source.

The goggle also may be operable to actively regulate the conditions to reduce fogging of the lens. The goggle may include sensors that are capable of sensing predetermined conditions such that the anti-fogging feature(s) may be automatically actuated based on sensed conditions.

In one embodiment of the present disclosure, a goggle with an anti-fogging lens, is provided, the google including a body portion operable to interface with a face of a user, the body portion including a body magnet electrically coupled to the power source; a power source; and a lens portion removably coupled to the body portion, the lens portion including a lens, a resistive element coupled to the lens, operable to be in electrical contact with the power source, and operable to heat the lens, and a lens magnet being in electrical connection with the resistive element, and the body magnet and the lens magnet forming complementary magnetic fields operable to hold the lens portion to the body portion, and the lens magnet operable to conduct electricity from the power source to the resistive element.

Further to some embodiments, the body portion forms a recess operable to receive the body magnet, and wherein the body magnet includes a trapezoidal profile with a first surface having a first width and a second, opposite surface having a second width that is narrower than the first width, and the first surface is positioned in the recess with the first surface facing into the body portion and the second surface facing away from the body portion.

Further to some embodiments, the body portion includes a body portion electrical conductor positioned in the recess between the body magnet and the body portion, and the electrical conductor is positioned between the power source and the body magnet within an electrical circuit.

Further to some embodiments, the lens portion includes an lens portion electrical conductor electrically coupled to the resistive element, and the lens portion electrical conductor is positioned between the lens magnet and the body magnet when the lens portion is coupled to the body portion.

Further to some embodiments, the body portion further includes a fan electrically coupled to the power source.

Further to some embodiments, the body portion further includes a temperature sensor, and the fan and the resistive element are operable to be activated when a predetermined temperature is sensed by the temperature sensor.

Further to some embodiments, the body portion further includes a humidity sensor, and the fan and the resistive element operable to be activated when a predetermined humidity is sensed by the temperature sensor.

Further to some embodiments, the goggle further includes a wireless transceiver operable to receive instructions for activating and deactivating the fan and the resistive element.

In one embodiment of the present disclosure, an anti-fogging goggle is provided, the anti-fogging goggle including a body portion operable to interface with a face of a user, the body portion including a power source; a lens portion operable to couple with the body portion, the lens portion and the body portion forming a goggle airspace; a sensor array operable to detect environmental conditions within the goggle airspace, the environmental conditions including at least one of temperature and humidity; and an active anti-fogging component electrically coupled to the power source and operable to actively modify the environmental conditions, the active anti-fogging component operable to be activated when a predetermined environmental condition is detected by the sensor array.

Further to some embodiments, the active anti-fogging component includes a fan.

Further to some embodiments, the sensor array is further operable to detect environmental conditions outside of the goggle airspace.

Further to some embodiments, the active anti-fogging component includes a resistive element applied to the lens portion.

Further to some embodiments, the anti-fogging goggle further includes a wireless transceiver operable to receive instructions for activating and deactivating the fan and the resistive element.

Further to some embodiments, the wireless transceiver is operable to receive instructions for altering the predetermined environmental condition.

Further to some embodiments, the body portion includes a body magnet and the lens portion includes a lens magnet, and the lens magnet and the body magnet forming magnetic fields operable to interact with each other to retain the lens portion with the body portion when the body magnet and the lens magnet are positioned proximate each other.

Further to some embodiments, the active anti-fogging component is electrically coupled to the power source via at least one of the body magnet and the lens magnet.

Further to some embodiments, the active anti-fogging component includes a resistive element coupled to the lens portion and a fan in fluid communication with the goggle air space, wherein the resistive element and the fan are operated independently.

In one embodiment of the present disclosure, an anti-fogging goggle lens for coupling to a goggle body is provided, the anti-fogging goggle lens including a transparent lens including a first side and a second side; a resistive element coupled to one of the first side and the second side; a coupling member comprising one of a magnet and a ferromagnetic material, and the coupling member being coupled to one of the first side and the second side; and an electrical lead extending from the resistive element and positioned abutting the coupling member.

Further to some embodiments, the electrical lead is in electrical contact with the coupling member and the coupling member is electrically conductive.

Further to some embodiments, the electrical lead is operable to be positioned between the coupling member and a corresponding coupling member on a goggle body when the anti-fogging goggle is coupled to a goggle body.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a google with an anti-fog lens, it should be understood that the features disclosed herein may have application to other types of systems using a lens for a user's eye, including helmets and visors.

Figure 1:
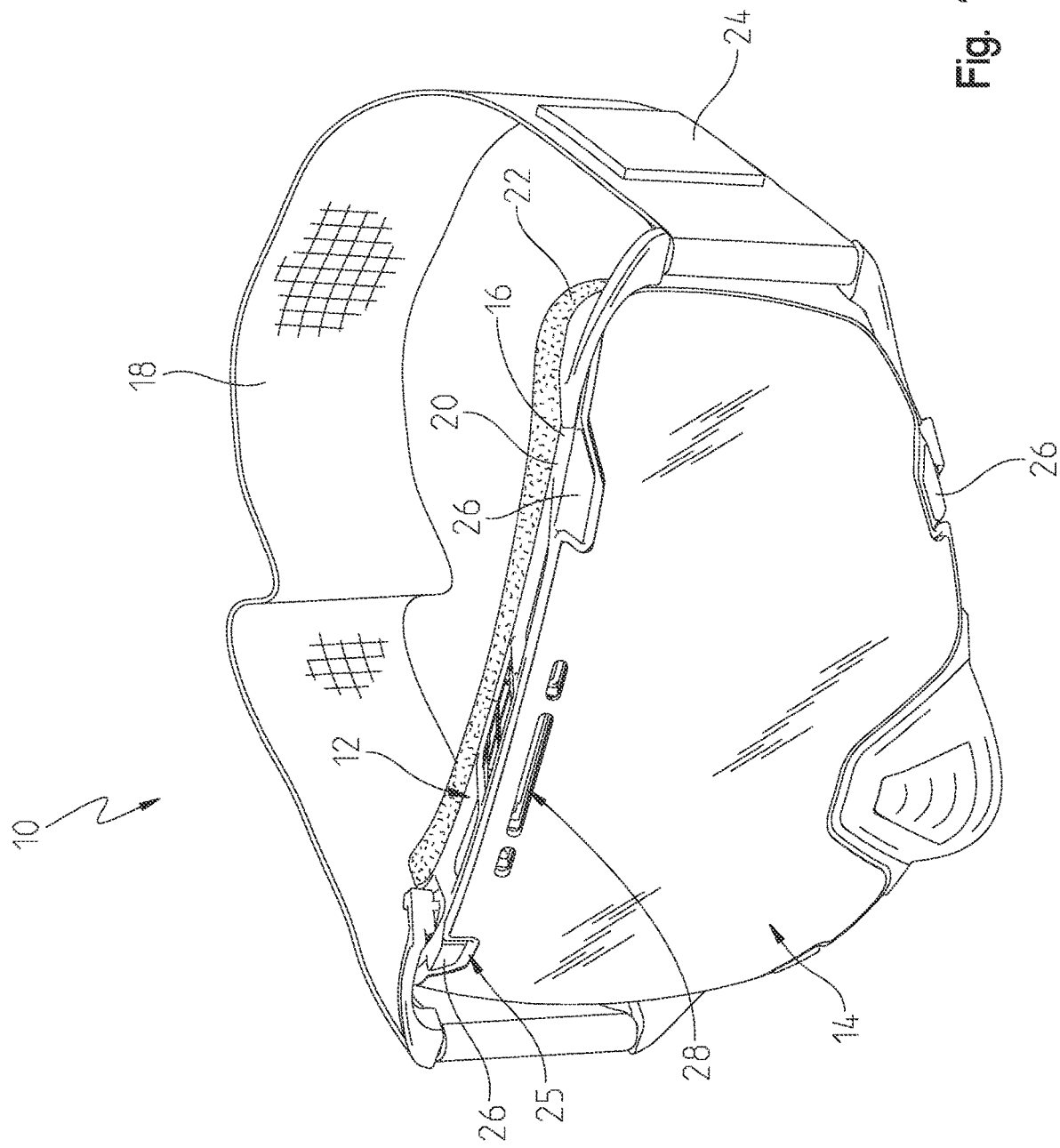
FIG. 1 is a perspective view of an anti-fogging goggle with an interchangeable lens and active anti-fogging features, according to the present disclosure.

With reference to FIG. 1, a goggle 10 includes a body portion 12 and a lens portion 14. Body portion 12 of goggle 10 is operable to secure goggle 10 to the user (not shown) and to maintain lens portion 14 with respect to the user and the user's eyes. Body portion 12 includes a frame 16 for interfacing with the face of a user and a strap 18 that can be used to couple goggle 10 to a user or a user's accessory (e.g., a user's helmet, not shown). In some embodiments, alternative systems may be used to couple goggle 10 to the user or user's accessories (e.g., a clip in system, not shown). Frame 16 may include a semi-rigid portion 20 that supports various components of goggle 10 and an interfacing member 22. Interfacing member 22 is operable to interface with the user's face and may include a compressible material such as a foam. Body portion 12 of goggle 10 further includes a power source 24, such as a battery pack. Power source 24 is operable to provide power to the various systems of goggle 10 and is described in more detail herein. Power source 24 can be mounted to strap 18 or may be mounted on frame 16. In some embodiments, power source 24 is integral with other components of goggle 10 (e.g., frame 16 or strap 18).

Figure 2:
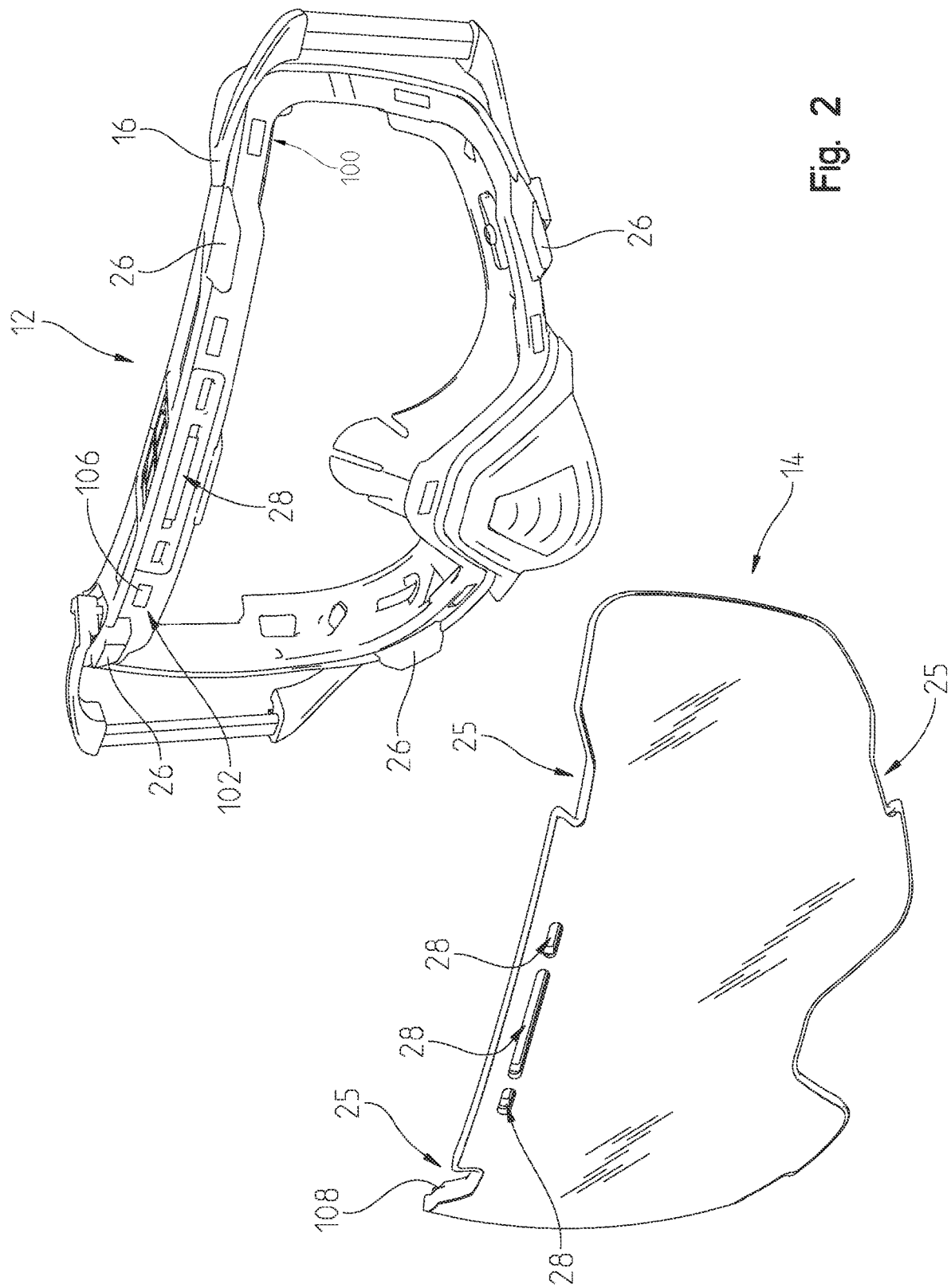
FIG. 2 is a perspective view of a body portion and a lens portion of the anti-fogging goggle of FIG. 1, where the lens portion is decoupled from the body portion.

Referring to FIGS. 1 and 2, lens portion 14 is removable from body portion 12 of goggle 10. Lens portion 14 includes a transparent or semi-transparent lens 15 through which a user may see, and which is operable to block or protect the user's eyes from debris, moisture, and sunlight, and to deflect air flow when travelling at high speeds. Lens portion 14 and body portion 12 interface with each other such that a substantial seal is formed between lens portion 14 and body portion 12. Lens portion 14 and body portion 12 include complimentary features that facilitate seating of lens portion 14 on body portion 12. For example, body portion 12 may include a guide member 26. Guide member 26 can protrude from a surface of body portion 12. Lens portion 14 can include a cutout or a notch 25 configured to interact with guide member 26 of body portion 12 to guide lens portion 14 into an engaged and coupled or seated position against the body portion 12.

Goggle 10 includes a lens-to-body coupling system 100. Coupling system 100 allows for lens portion 14 to be removably and selectively coupled to body portion 12. This allows for lens portion 14 to be removed and interchanged with another lens, if desired by the user. For example, lenses may be replaced due to wear of the lens, altered lighting conditions, or for changing the aesthetics of the goggle 10. Coupling system 100 includes a body interface 102 and a lens interface 104 (see FIG. 11). Body interface 102 (FIG. 2) and lens interface 104 (FIG. 11) cooperate with each other to hold lens portion 14 to body portion 12 of goggle 10. In some embodiments, coupling system 100 is a magnetic coupling system. Illustratively, body interface 102 includes at least one body permanent magnet 106 and lens interface 104 includes at least one lens permanent magnet 108 (see FIG. 11). Body permanent magnet 106 and lens permanent magnet 108 are oriented such that the corresponding permanent magnets 106, 108 on body portion 12 and lens portion 104 form interacting magnetic fields that apply an attractive magnetic force and accordingly hold lens portion 14 with body portion 12. In some embodiments, only one of body portion 12 or lens portion 14 includes a permanent magnet 106 or 108, whereas the other includes a ferromagnetic material which is attracted by the magnetic field formed by permanent magnet 106 or 108. Lens portion 14 may be manually disengaged from body portion 12 by applying sufficient force to lens portion 14 to overcome the attractive force applied by the magnetic field formed by permanent magnets 106 and/or 108. The strength of the magnetic fields may be varied for different purposes. For example, in some embodiments, a stronger magnetic field may be implemented in which the user is involved in higher impact activities, whereas a weaker magnetic field may be implemented for low-impact activities.

Figure 3:
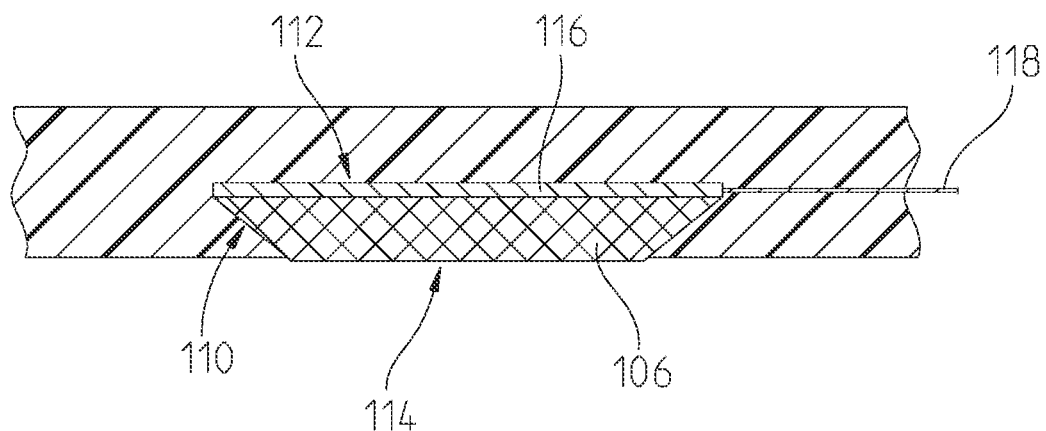
FIG. 3 is a cross-sectional view of a first embodiment of an attachment or coupling mechanism for coupling the lens portion to the body portion.
Figure 4:
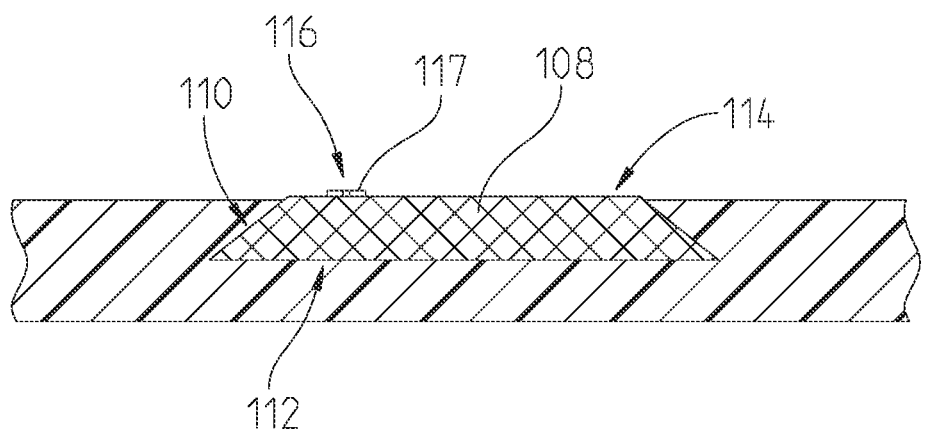
FIG. 4 is a cross-sectional view of a second embodiment of the attachment or coupling mechanism of the google of FIG. 1.

Referring to FIGS. 3 and 4, magnets 106, 108 may be shaped to be received into a respective magnet receiver 110 on each of body portion 12 and lens portion 14. Magnet receiver 110 may be defined as a recess or component configured to receive magnets 106, 108 and which has a complementary shape to the shape of magnets 106, 108. For example, in some embodiments, magnets 106, 108 may be in the shape of a wedge or trapezoid. Thus, a first surface 112 may have a greater width than a second surface 114. When magnets 106, 108 are installed into the corresponding magnet receivers 110 of body portion 12 and lens portion 14, first surface 112 is positioned interior to second surface 114. This shape can increase the security of magnets 106, 108 within receivers 110 because the wider first surface 112 has a greater width than the width of the opening of receivers 110 adjacent second surface 114.

Goggle 10 may include active anti-fogging features, passive anti-fogging features, or both. Furthermore, goggle 10 may include a plurality of each passive and active anti-fogging features in any combination. The features discussed herein are therefore not limited to any specific embodiment, but may be used in isolation or in combination with any of the other anti-fogging features.

Figure 6:
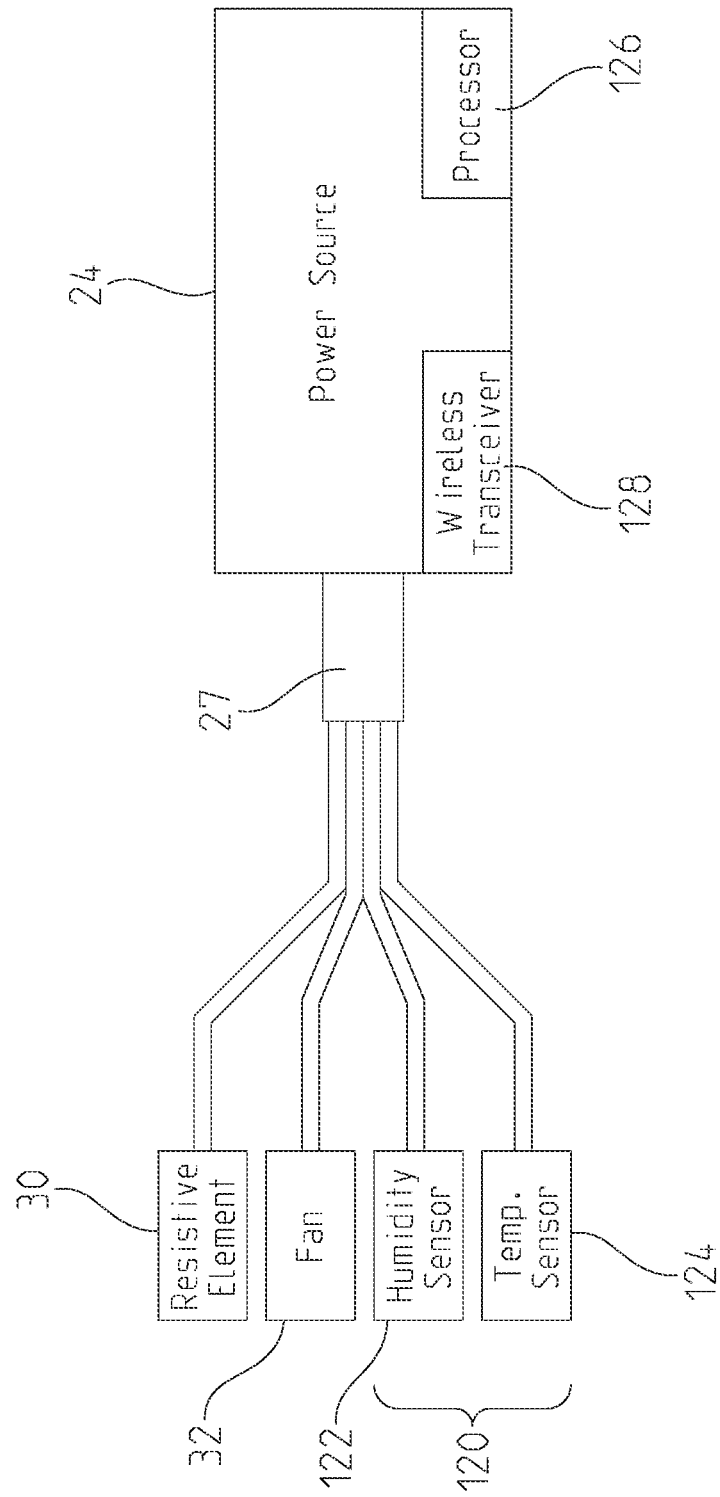
FIG. 6 is a schematic view of a power source coupled to anti-fogging features and a sensor array.
Figure 8:
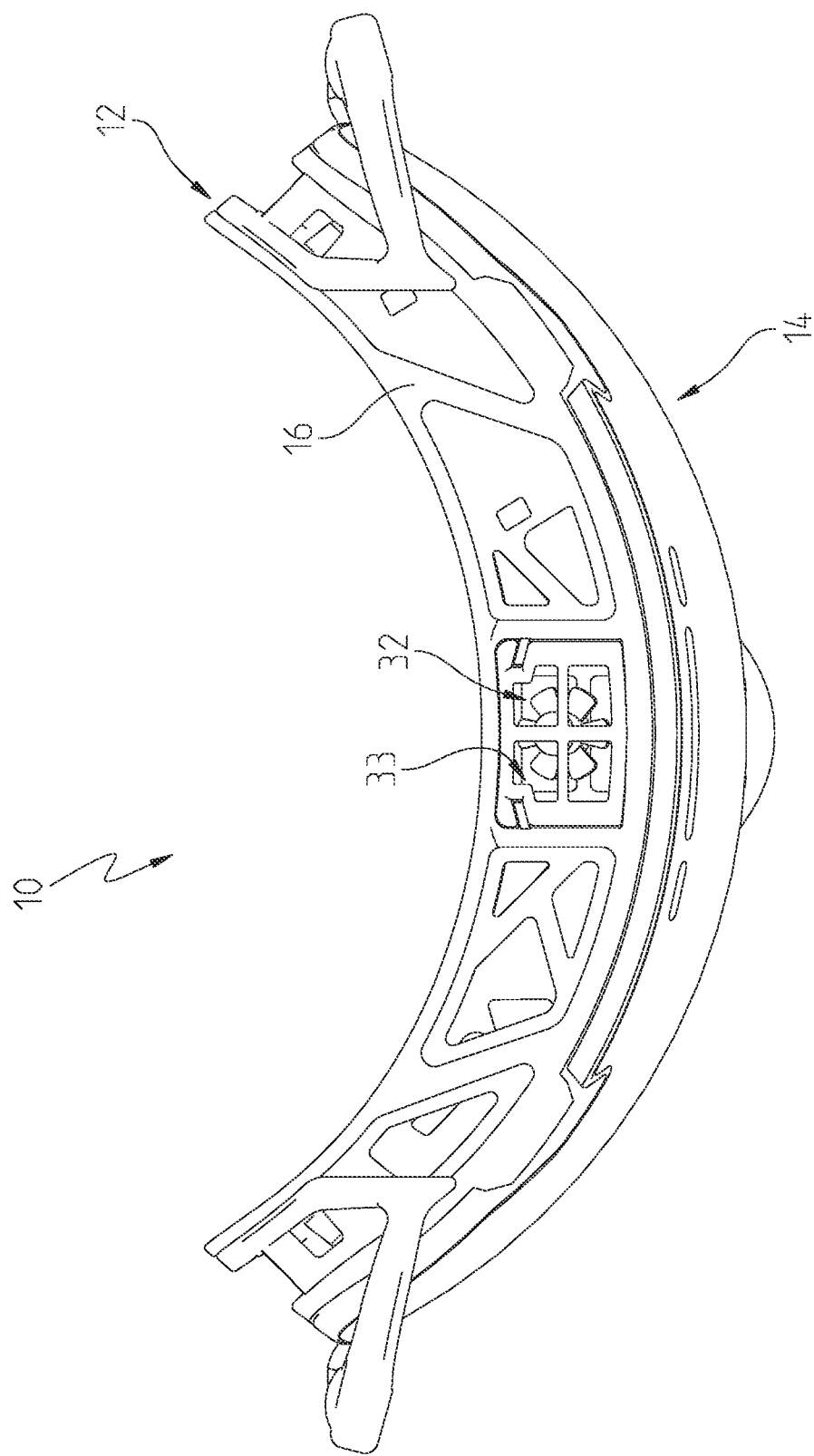
FIG. 8 is a top view of the goggle of FIG. 1 implementing an integrated fan for fog management within the goggle.

Some of the active anti-fogging features can include a resistive element 30 and a fan 32 (FIG. 6). Resistive element 30 is operable to modify the temperature of lens portion 14 within predetermined parameters which reduce or prevent condensation on a surface of lens portion 14. Referring to FIG. 8, fan 32 can be incorporated into body portion 12 of goggle 10. For example, fan 32 may be embedded in semi-rigid portion 20 of body portion 12. In some embodiments, fan 32 is operable to actively move air within a goggle space formed within goggle body 12 and goggle lens 14 (e.g., between goggle 10 and the user when engaged on a user's head) and thus reduces fogging by increasing air movement and modulating humidity around lens portion 14. Body portion 12 includes fan ventilation channels 33 (FIG. 8) that allow fan 32 to pull in or exhaust from the goggle space.

Resistive element 30 may be a film or a wire that is applied to a surface or incorporated into lens portion 10. For example, in some embodiments, resistive element 30 is an indium tin oxide ("ITO") film that is heated when a current is supplied thereto. Resistive element 30 can be applied to a first or inner surface, a second or outer surface, or to both the first surface and second surface of lens 15. Resistive element 30 is operable to be in electrical connection with power source 24 when lens portion 14 is coupled to or engaged with body portion 12.

The electrical connection between lens portion 14 and body portion 12 can be accomplished via coupling system 100. In this way, coupling system 100 may provide both the physical connection or coupling between lens portion 14 and body portion 12 and also may provide the election connection or coupling between power source 24 and the various components disclosed herein. For example, in those embodiments where coupling system 100 includes magnets 106 and/or 108 and possibly ferromagnetic materials which magnets 106 or 108 attract, the electrical current can flow through at least a portion of magnets 106 and/or 108 and the ferromagnetic materials. For example, with reference to FIG. 3, in some embodiments, receiver 110 includes sufficient space to contain magnet 106 or 108 and an electrical conductor 116 (e.g., a metal or metalized plate or tab or an electrical lead) that is held in contact with magnet 106 or 108 by receiver 110. Electrical conductor 116 may be further secured to magnets 106, 108, for example, via a weld, adhesive, bracket, or so forth. In some embodiments, magnets 106, 108 are coated or treated with a conductive material (e.g., nickel plated). A wire 118 leads to and is in contact with electrical conductor 116. Wire 118 is in electrical contact with power source 24 (e.g., for body magnets 106) and/or resistive element 30 (e.g., for lens magnets 108).

Thus, in some embodiments, an electrical current is provided to resistive element 30 from power source 24 by supplying power to wire 118 which flows to electrical conductor 116 and is supplied to body magnet 106 via the physical contact between electrical conductor 116 and magnet 106. Additionally, because electrical conductor 116 also is in contact with resistive element 30, power also is supplied thereto. Stated otherwise, magnets 106, 108 are operable to complete the electrical circuit between power source 24 and resistive element 30. It is understood that body magnet 106 or lens magnet 108 may be interchangeable with a ferromagnetic material while maintaining the principle of operation described. Furthermore, in some embodiments, wire(s) 118 may be in direct contact with magnets 106, 108, thus one or both of electrical conductors 116 may not be implemented.

Referring now to FIG. 4, in some embodiments, electrical conductor 116 is provided on lens portion 14 such that electrical conductor 116 is positioned between body magnet 106 and lens magnet 108 when lens portion 14 is coupled to and engaged with body portion 12. For example, electrical conductor 116 may include a blade 117 that extends from the resistive element 30 such that a first end of the blade 117 is positioned adjacent to lens magnet 108. This allows the electrical conductor 116 to remain in plane with the resistive element 30, thus simplifying manufacture of goggle 10 and helps ensure electrical conductance between power source 24 and resistive element 30. For example, electrical conductor 116 may be riveted to lens portion 14 such that electrical conductor 116 is positioned or laid across lens magnet 108, e.g., parallel to the surface of lens magnet 106. Electrical conductor 116 is positioned between body magnet 106 and lens permanent magnet 108 when lens portion 14 is coupled to body portion 12.

Goggle 10 may also include passive anti-fogging features. For example, and with further reference to FIGS. 1 and 2, lens portion 14 and body portion 12 may each include corresponding ventilation apertures 28 through which air may flow. Lens portion 14 includes lens ventilation apertures 28a that align with body ventilation apertures 28b such that air may flow through ventilation apertures 28 and reduce fogging of lens portion 14 of goggle 10. Ventilation apertures 28 are a passive anti-fogging feature. Other passive anti-fogging features include but are not limited to films, membranes, or treatment applied to or incorporated into lens portion 14 to reduce fogging of lens portion 14 (e.g., materials with hydrophobic properties).

Figure 5:
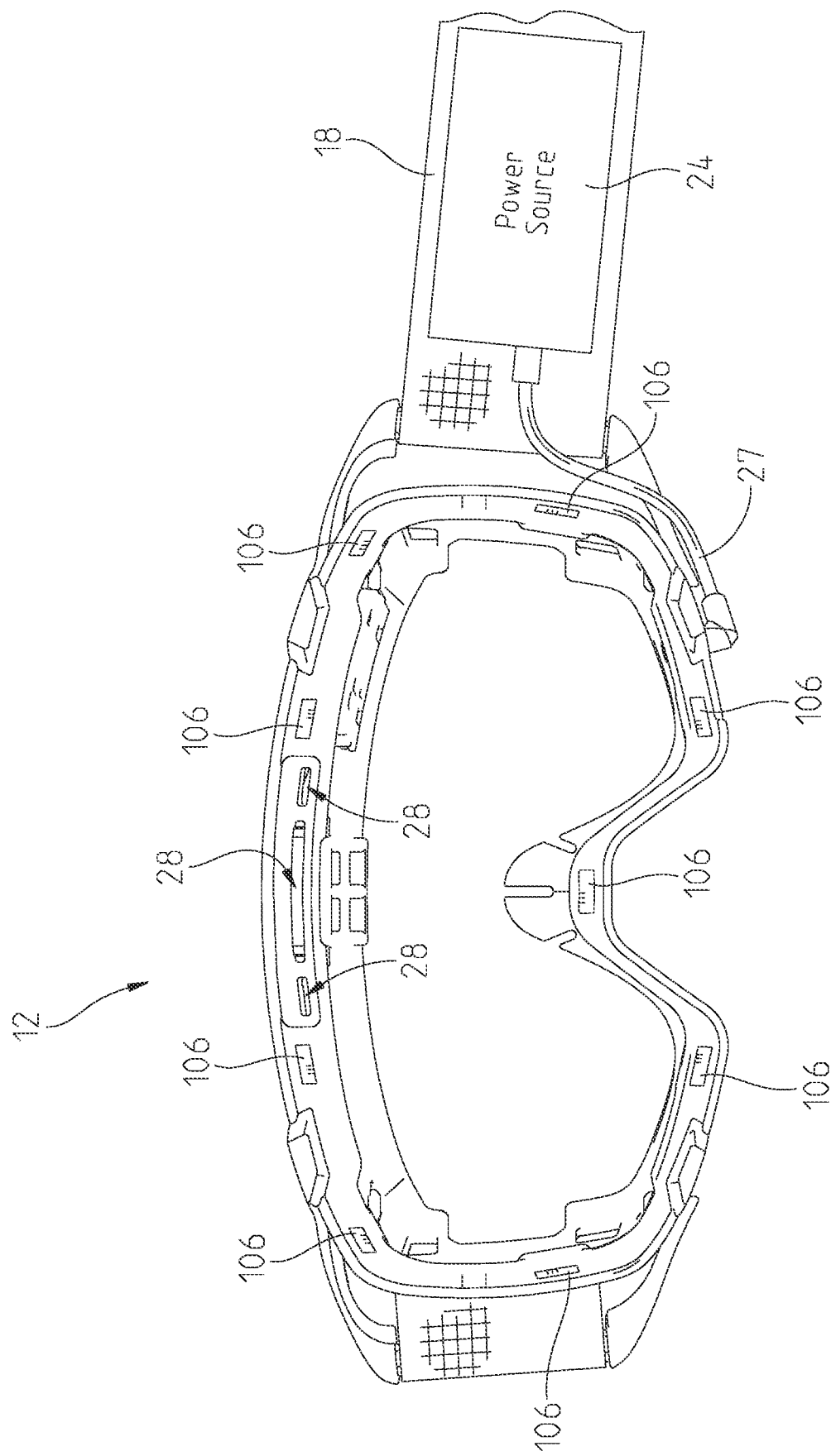
FIG. 5 is a perspective view of the body portion of the goggle of FIG. 1, the body portion including a power source for powering the anti-fogging features of the goggle.

Referring now to FIG. 5, body portion 12 is shown without lens portion 14. In some embodiments, power source 24 (e.g., a battery pack), is coupled to strap 18. Power source 24 can be rechargeable and/or interchangeable. Power source 24 includes a wiring harness 27 that is operable to provide power to the various components of goggle 10 that require power. For example, and with reference to FIG. 6, power source 24 may be electrically coupled to resistive element 30, fan 32, and a sensor array 120. Sensor array 120 can include a humidity sensor 122 and/or a temperature sensor 124. Sensor array 120 can be coupled to or mounted to goggle 10 at various positions. Furthermore, separate sensors of sensor array 120 can be located at different locations on goggle 10. For example, sensor array 120 may be mounted on body portion 12 of goggle 10. Humidity sensor 122 may be mounted at a position to detect the humidity conditions of the goggle space formed between goggle 10 and the user. Temperature sensor 124 can be mounted similarly, or in other embodiments, can be mounted to detect the environmental temperature outside of the goggle space, or the temperature of lens portion 14, and therefore may be mounted on lens portion 14. Various other sensors may be included, for example, GPS sensors (not shown), accelerometers (not shown), and so forth.

In some embodiments, power source 24 includes a processor 126. Processor 126 is operable to control each of active anti-fogging features (e.g., resistive element 30 and fan 32) and sensor array 130 (e.g., humidity sensor 122 and temperature sensor 124). Processor 126 is further operable to receive data from the sensor array representing the readings taken by sensor array 120 and provide instructions to the active anti-fogging features and/or power source 24 when predetermined conditions are sensed. For example, the predetermined conditions for activating the active anti-fogging features may include a threshold or predetermined humidity percentage within the goggle space or a threshold or predetermined temperature within the goggle space, environmental temperature, lens temperature, and/or temperature differential between lens 15, the goggle space, and/or the environmental temperature.

In some embodiments, goggle 10 further includes a wireless transceiver 128 operable to send and receive information wirelessly. Wireless transceiver 128 is further operable to communicate with processor 126. In some embodiments, wireless transceiver 128 is operable to receive instructions from a remote source (e.g., a cellular device) for controlling the active anti-fogging features (e.g., resistive element 30 and/or fan 32) and sensor array 120. The instructions can include algorithms for controlling the power output and activation of the components. Thus, the features can be tuned for high efficiency modes, performance modes, timed modes, and so forth. This allows the user to select appropriate settings for the activity, for example, the user may desire a high performance mode where goggles 10 are running the anti-fogging components consistently for a shorter period of time, in contrast to a mode that requires efficiency to preserve the charge of power source 24 for long durations without having to recharge or replace power source 24. Any updates to the system can be received via the wireless transceiver. It is recognized that the wireless transceiver can operate under a variety of wireless protocols, including cellular, Bluetooth™ Wi-Fi™, and so forth. Thus, the goggles 10 may be wirelessly connected to a cellular phone, a vehicle, or otherwise. It is understood that the active anti-fogging components may be activated in any matter, including but not limited to, timed, cycled, triggered, and so forth. For example, the goggle 10 may use a predetermined power level consistently. The various antifogging components may draw specific amounts of power to remain at a consistent power draw either by alternating activation, running contemporaneously at reduced power levels, or so forth. The specific settings may be varied in response to temperature and/or humidity conditions.

Figure 7A:
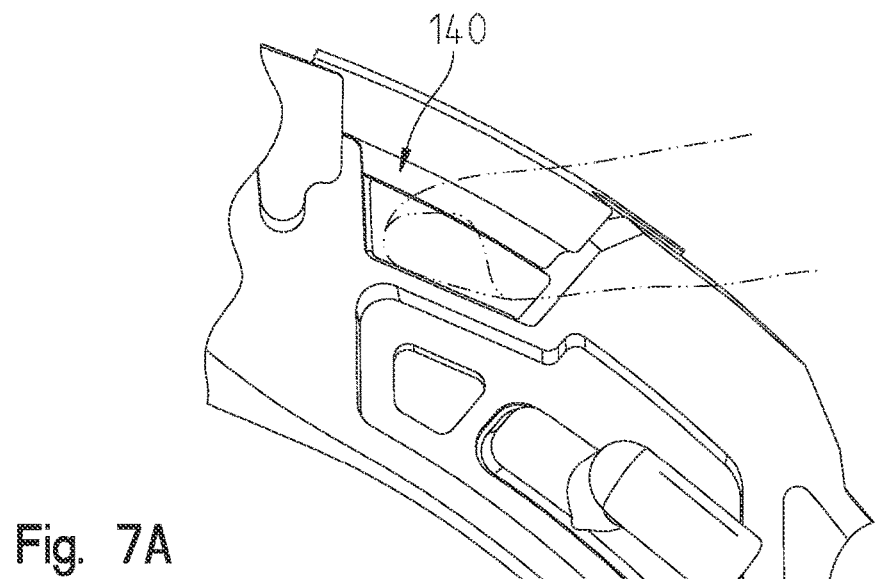
FIGS. 7A and 7B illustrate removal of the lens portion.
Figure 7B:
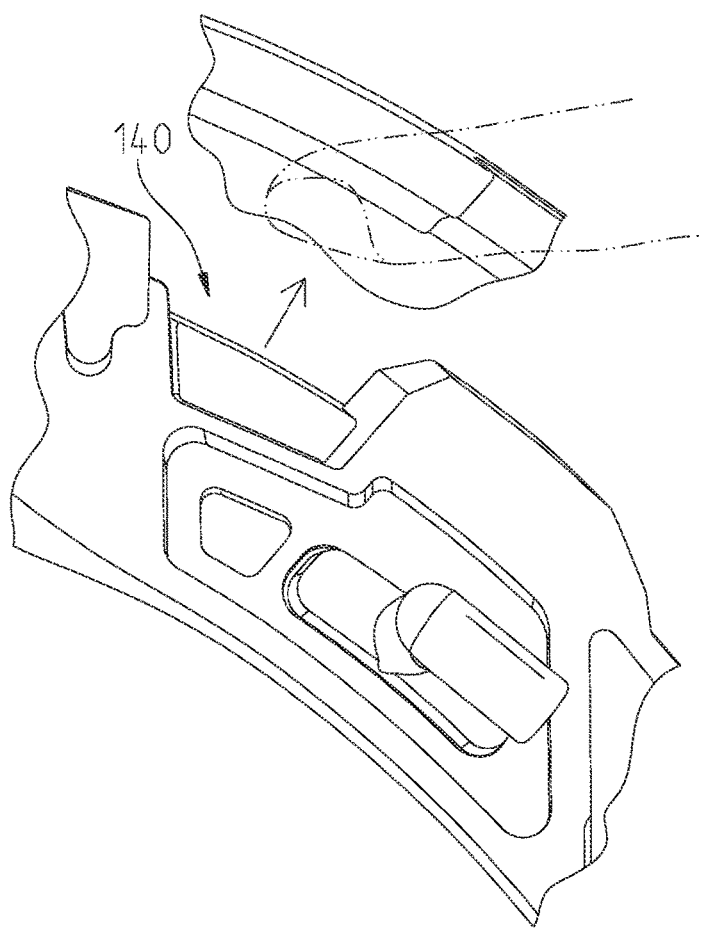

Referring to FIGS. 7A and 7B, goggle body 12 includes a recess 140 to provide access to lens portion 14 when lens portion 14 is coupled to body portion 12. A user can position an object (e.g. a finger) under lens portion 14 via recess 140 to pivot or translate lens portion 14 away from body portion 12.

Figure 9:
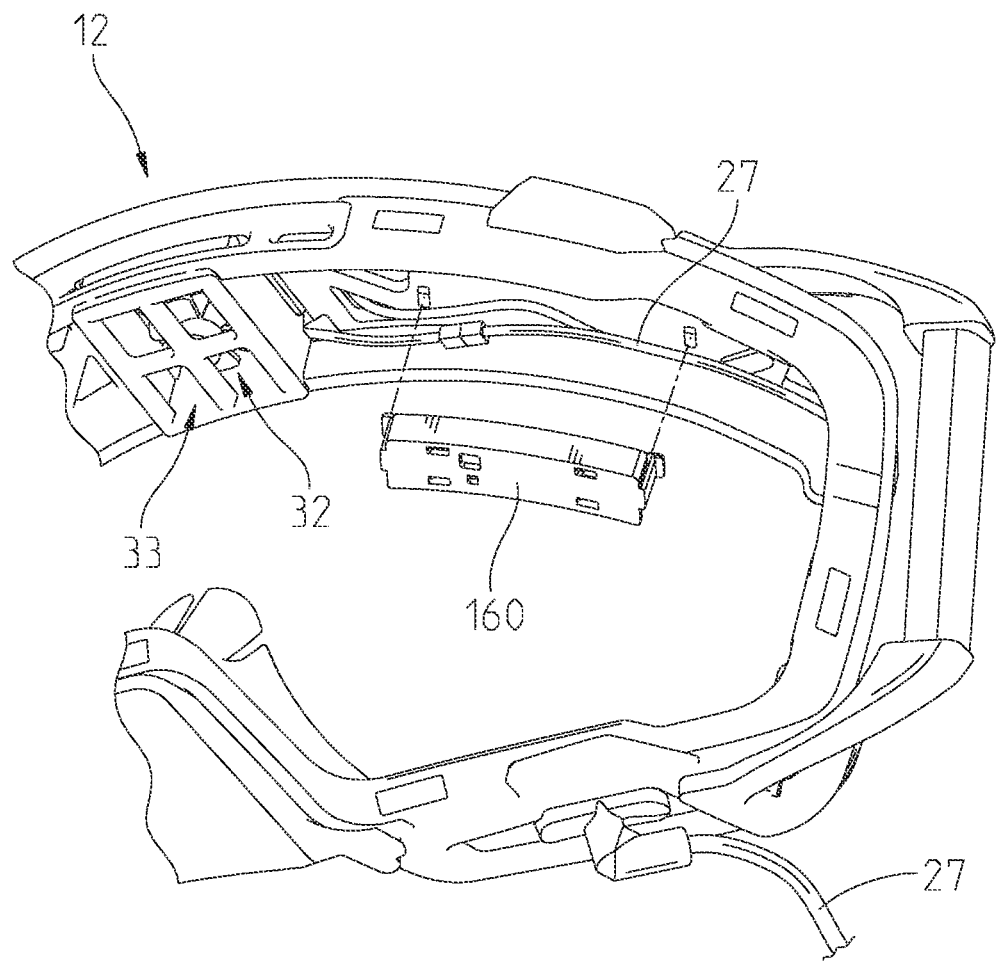
FIG. 9 is an exploded view of the body portion and a wire clip for a wiring harness for electrically coupling anti-fogging features with the power source.
Figure 10:
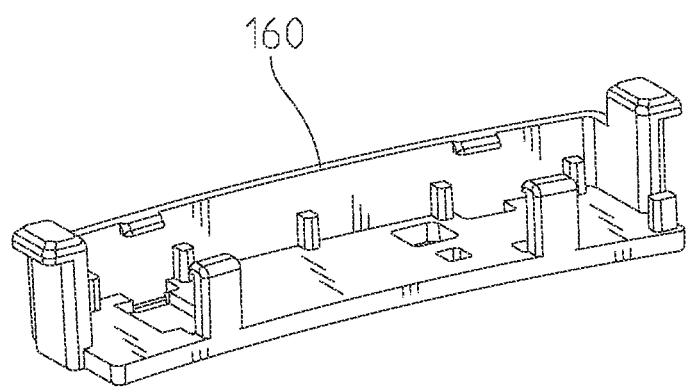
FIG. 10 is a perspective view of the wire clip of FIG. 9.

Referring to FIGS. 9 and 10, a wiring harness 27 and a clip 160 is illustrated. Wiring harness 27 is operable to conduct electricity from power source 24 to the various components described herein. When resistive element 30 is coupled to lens portion 14, wiring harness 27 may be configured such that resistive element 30 is wired in parallel with the other components, such that if lens portion 14 is interchanged with another lens portion that does not include a resistive element, the various other components still can operate to provide anti-fogging features. Wiring harness 27 can also permit interchangeability of components (e.g., replacement of defective components or upgrades of systems or sensor arrays). Clip 160 is provided to permit selective access to wiring harness 27 and/or other components of goggles 10 while also optionally providing protection to wiring harness 27 (e.g., against moisture intrusion).

Figure 11:
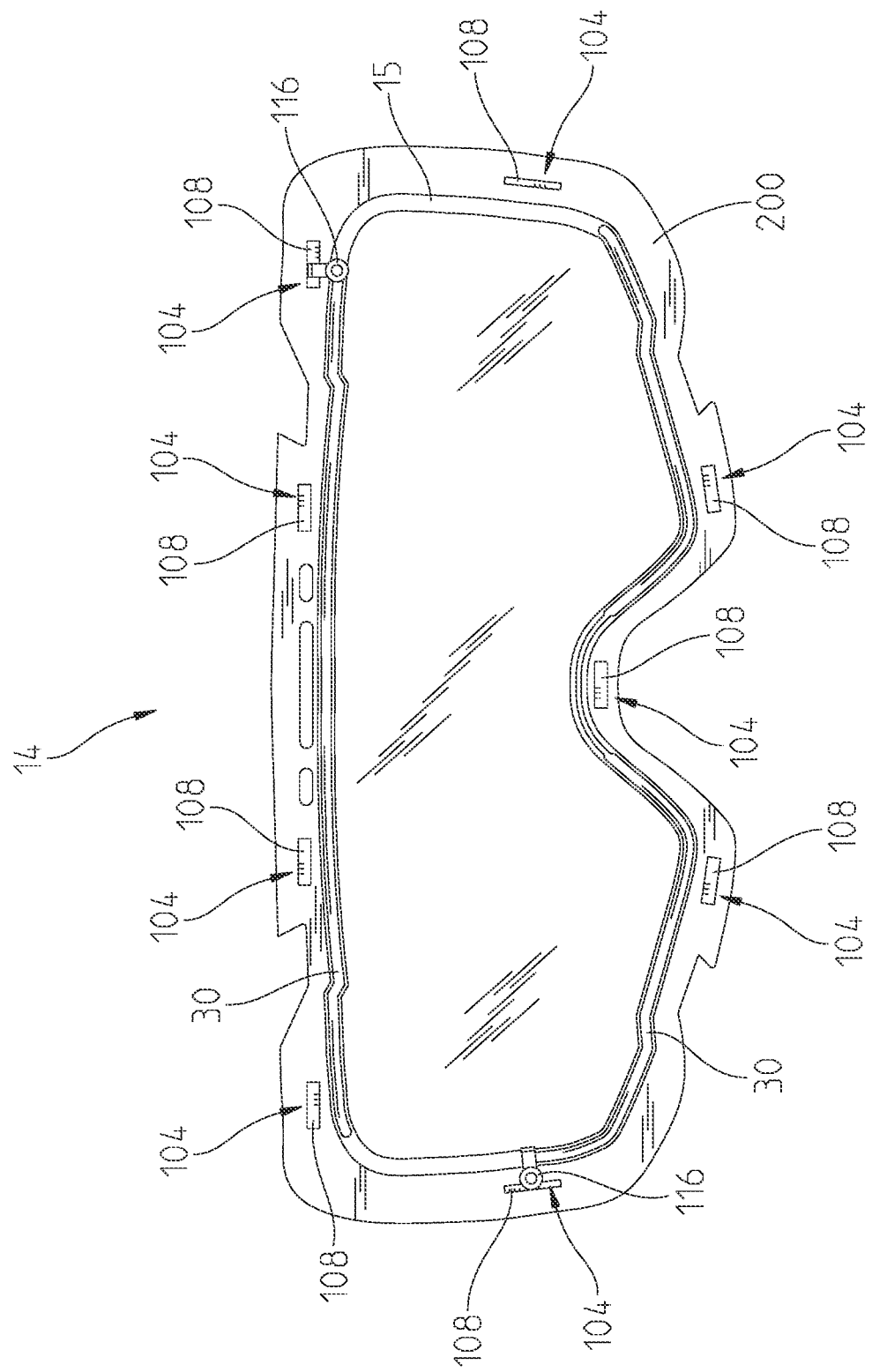
FIG. 11 is a front view of the lens portion of the goggle of FIG. 1.

Referring to FIG. 11, an illustrative embodiment of lens portion 14 is illustrated in greater detail. Lens portion 14 includes a frame member 200 to which lens 15 is mounted. Frame member 200 includes a plurality of recesses (not shown) operable to receive lens magnets 108 as previously described. Lens magnets 108 may be spaced around the periphery of frame member 200, providing various coupling positions around lens portion 14. As illustrated, some of lens magnets 108 may have an electrical conductor 116 positioned proximate or abutting lens permanent 108. Electrical conductor 116 is in electrical contact with body magnet 106 when lens portion 14 is coupled to body portion 12, in some embodiments because electrical conductor 116 is positioned between body magnet 106 and lens magnet 108. Electrical conductor 116 is also in electrical contact with resistive element 30. This allows power to be conducted from power source 24 to resistive element 30. Resistive element 30 can be applied to lens 15 in various patterns. For example, in those embodiments in which resistive element 30 is a wire, resistive element 30 is positioned near the periphery of lens 15. In those embodiments implementing a film (e.g., ITO film), resistive element 30 may be applied across the surface of lens 15.

While this invention has been described as having an exemplary design, the present invention may be further modified within the spirit and scope of this disclosure. For example, the principles described in this application could be applied to a helmet and visor system, and so forth. This application is therefore intended to cover any variations, uses, or adaptations of the invention using its general principles. Further, this application is intended to cover such departures from the present disclosure as are within known or customary practice in the art to which this invention pertains.

What is claimed is:

1. A goggle with an anti-fogging lens, comprising:
a power source;

a body portion configured to interface with a face of a user, the body portion including a body magnet electrically coupled to the power source; and a lens portion removably coupled to the body portion, the lens portion including a lens, a resistive element coupled to the lens, operable to be in electrical contact with the power source, and operable to heat the lens, and a lens magnet being in electrical connection with the resistive element, and the body magnet and the lens magnet forming complementary magnetic fields operable to hold the lens portion to the body portion, and the lens magnet operable to conduct electricity from the power source to the resistive element.

2. The goggle of claim 1, wherein the body portion forms a recess operable to receive the body magnet, and wherein the body magnet includes a trapezoidal profile with a first surface having a first width and a second, opposite surface having a second width that is narrower than the first width, and the first surface is positioned in the recess with the first surface facing into the body portion and the second surface facing away from the body portion.

3. The goggle of claim 2, wherein the body portion includes a body portion electrical conductor positioned in the recess between the body magnet and the body portion, and the electrical conductor is positioned between the power source and the body magnet within an electrical circuit.

4. The goggle of claim 1, wherein the lens portion includes a lens portion electrical conductor electrically coupled to the resistive element, and the lens portion electrical conductor is positioned between the lens magnet and the body magnet when the lens portion is coupled to the body portion.

5. The goggle of claim 1, wherein the body portion further includes a fan electrically coupled to the power source.

6. The goggle of claim 5, wherein the body portion further includes a temperature sensor, and the fan and the resistive element are operable to be activated when a predetermined temperature is sensed by the temperature sensor.

7. The goggle of claim 5, wherein the body portion further includes a humidity sensor, and the fan and the resistive element operable to be activated when a predetermined humidity is sensed by the temperature sensor.

8. The goggle of claim 5, further comprising a wireless transceiver operable to receive instructions for activating and deactivating the fan and the resistive element.

9. An anti-fogging goggle, comprising:
a body portion including an interface member, the interface member being shaped to interface with a face of a user, the body portion including a power source;
a lens portion operable to removably couple with the body portion, the lens portion and the body portion forming a goggle airspace;
a sensor array operable to detect environmental conditions within the goggle airspace, the environmental conditions including at least one of temperature and humidity;
an active anti-fogging component electrically coupled to the power source and operable to actively modify the environmental conditions, the active anti-fogging component operable to be activated when a predetermined environmental condition is detected by the sensor array; and
a wireless transceiver operable to receive instructions for activating and deactivating the active anti-fogging component.

10. The anti-fogging goggle of claim 9, wherein the active anti-fogging component includes a fan.

11. The anti-fogging goggle of claim 9, wherein the sensor array is further operable to detect environmental conditions outside of the goggle airspace.

12. The anti-fogging goggle of claim 11, wherein the active anti-fogging component includes a resistive element applied to the lens portion.

13. The anti-fogging goggle of claim 9, wherein the wireless transceiver is operable to receive instructions for altering the predetermined environmental condition.

14. The anti-fogging goggle of claim 9, wherein the body portion includes a body magnet and the lens portion includes a lens magnet, and the lens magnet and the body magnet forming magnetic fields operable to interact with each other to retain the lens portion with the body portion when the body magnet and the lens magnet are positioned proximate each other.

15. The anti-fogging goggle of claim 14, wherein the active anti-fogging component is electrically coupled to the power source via at least one of the body magnet and the lens magnet.

16. The anti-fogging goggle of claim 9, wherein the active anti-fogging component includes a resistive element coupled to the lens portion and a fan in fluid communication with the goggle air space, wherein the resistive element and the fan are operated independently.

17. The anti-fogging goggle of claim 9, wherein the lens portion is removably coupled to the body portion via at least one magnet.

18. An anti-fogging goggle lens for coupling to a goggle body, the anti-fogging goggle lens comprising:
a transparent lens including a first side and a second side;
a resistive element coupled to one of the first side and the second side;
a coupling member comprising one of a magnet and a ferromagnetic material, and the coupling member being coupled to one of the first side and the second side; and
an electrical lead extending from the resistive element and positioned abutting the coupling member.

19. The anti-fogging goggle lens of claim 18, wherein the electrical lead is in electrical contact with the coupling member and the coupling member is electrically conductive.

20. The anti-fogging goggle lens of claim 18, wherein the electrical lead is operable to be positioned between the coupling member and a corresponding coupling member on a goggle body when the anti-fogging goggle is coupled to a goggle body.

* * * * *